Jan. 15, 1952     E. G. PERRY, JR     2,582,793
METHOD AND APPARATUS FOR RECORDING VIBRATIONAL DATA
Filed June 21, 1948

Inventor
E. Gordon Perry, Jr.
By Stevens, Davis, Miller and Mosher
Attorneys

Patented Jan. 15, 1952

2,582,793

UNITED STATES PATENT OFFICE 2,582,793

METHOD AND APPARATUS FOR RECORDING VIBRATIONAL DATA

Edward Gordon Perry, Jr., Dallas, Tex., assignor to General Instruments Inc., a corporation of Delaware Application June 21, 1948, Serial No. 34,326

12 Claims. (Cl. 346—1)

This invention relates to methods and apparatus for recording data and is more particularly concerned with the simultaneous photographic recording of several different species of data related to the same incident in such a way that the separate records are readily distinguishable for comparative study.

In the measuring and testing arts, where wave energy studies and comparisons are necessary, it is often desirable to compare functionally related data such as voltages and amperages, stresses and strains, fundamentals and harmonics or the like. In effecting comparisons of this sort, it is necessary that the separate responses to the stimulus be so recorded that they are subject to comparison with one another and with respect to common or known reference points. For example, in seismic surveying, it is often desirable to compare a composite and a straight signal both relating to the same seismic event. This has been heretofore accomplished by recording separate spaced traces on a record tape and then reading the traces relative to one another and relative to common reference points, such as timing lines. The straight record is of value for depth determination and for timing but the composite record is often superior in eliminating confusing localized subterranean structures from the over-all prospecting picture. To read the traces together, however, requires a high degree of skill, due to the fact that the traces must be spaced apart sufficiently to prevent overlapping which will cause confusion in the case of traces of like appearance.

It is therefore an object of this invention to overcome the foregoing difficulties and to provide for the simultaneous recording of continuously arriving data by traces of distinctive appearance and hence permit several types of data to be recorded in close proximity on a single record strip where they will be easily comparable and related to exactly the same reference coordinates.

It is proposed, according to this invention, to provide a plurality of traces which are visually distinguishable and which may be separately recorded in response to different measurements of the response to one or more stimuli. These traces will be recorded on a single record tape in relatively close proximity and may even overlap or intersect.

It is a further object of this invention to provide a recording oscillograph in which a light trace and a shadow trace may oscillate about a common axis so that the traces intersect and overlap for easy comparative reading while any individual trace is readily distinguishable from the other trace with which it is to be compared.

Other objects and advantages of this invention will be apparent upon consideration of the following detailed description of a preferred embodiment thereof in conjunction with the annexed drawings wherein.

Figure 1:
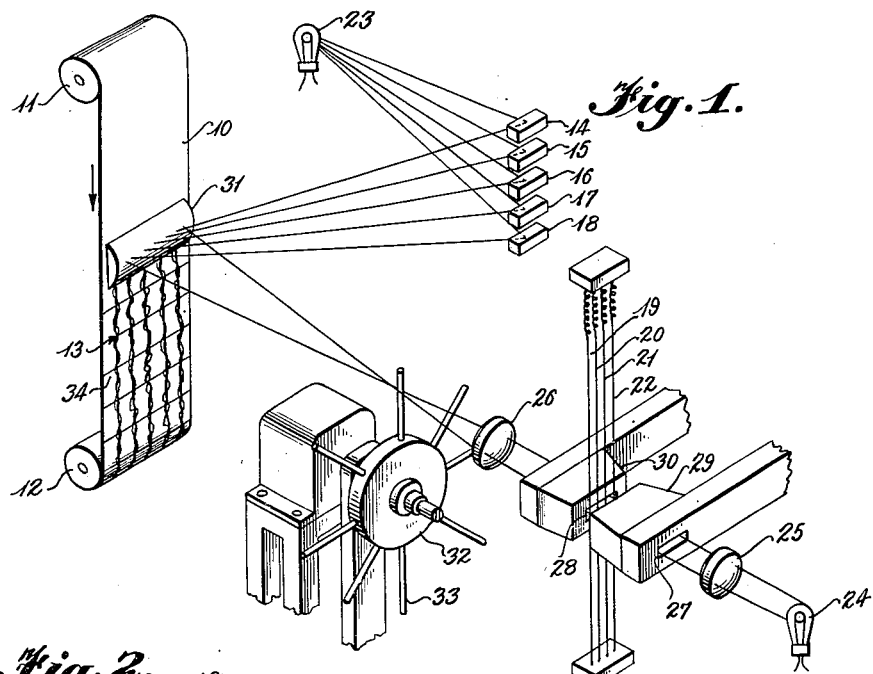
Figure 1 is a schematic perspective view of a recording oscillograph constructed in accordance with the principles of the present invention.

Referring now in greater detail to Figure 1, the numeral 10 represents a photographic film or photographic paper in tape form which is fed by conventional means, not shown, from a storage roll 11 to a take-up roll 12. Impressed on this tape are a plurality of traces, indicated generally at 13. These traces are produced by mirror galvanometers 14, 15, 16, 17 and 18 and string galvanometers 19, 20, 21 and 22. The light reflected from the mirror galvanometers to the tape 10 is derived from a source diagrammatically indicated at 23. The entire tape is bathed in light from a light source 24 which acts through lenses 25 and 26 as well as slots 27 and 28 disposed in pole pieces 29 and 30, respectively, of the string galvanometer assembly. It is now apparent that the traces produced by the string galvanometers are shadows. It is further apparent that the entire film is exposed to some light from the source at 24. Consequently, upon development of the film, the background of the tape 10 is gray, while the traces produced from the string galvanometers are white and those produced from the mirror galvanometers are black.

In addition to the apparatus just described, Figure 1 also includes a conventional condensing lens 31 located adjacent the film 10, and a timing wheel 32 having spokes 33 which interrupt the light path between the lenses 26 and 31 at regular intervals to produce timing lines 34 extending across the tape 10 and constituting reference lines for the reading of the several traces.

Figure 2:
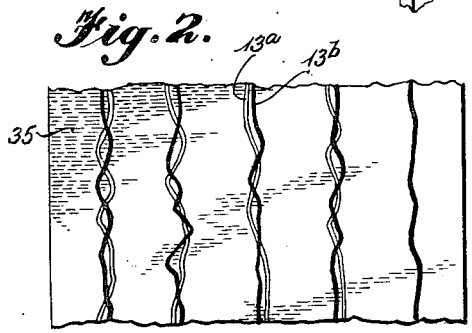
Figure 2 is a fragmentary view of typical traces producible by the apparatus of Figure 1.

In Figure 2 the traces 13 are shown in greater detail. The numeral 13a designates a typical trace producible by one of the strings while the numeral 13b indicates a typical trace producible by one of the mirrors. The background of the tape is indicated by the gray area 35.

Figure 3:
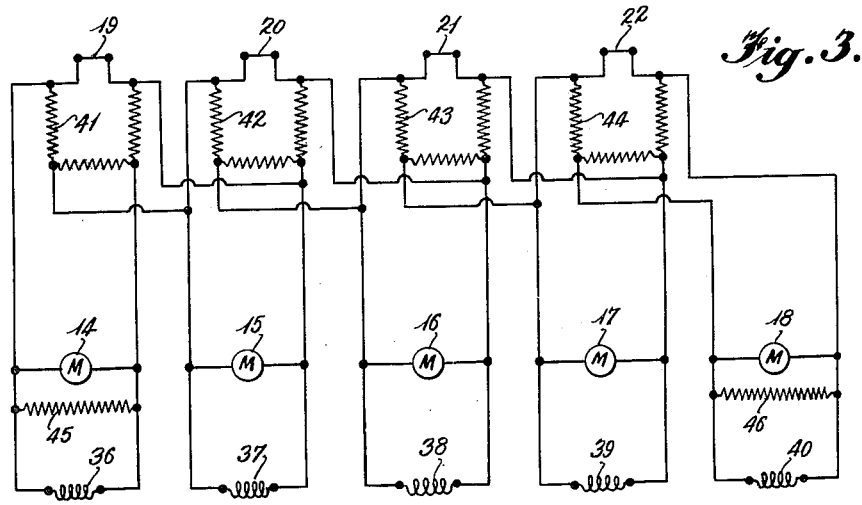
Figure 3 is a circuit diagram indicating a typical installation of the apparatus of the present invention for seismic prospecting.

The recording oscillograph shown in Figure 1 has been discussed without reference to the mode of energizing of the several galvanometers. In Figure 3, however, there is shown by way of example, an arrangement whereby the straight and composite outputs of a plurality of seismometers may be impressed on several galvanometers to be recorded in the manner shown in Figure 1. In this case each seismometer is connected to an amplifier and the output of each amplifier is connected to a transformer primary. The secondaries for five seismometers are indicated at 36, 37, 38, 39 and 40 in Figure 3, it being understood that each secondary is connected to the primary of an amplifier, not shown, and that the amplifier is connected to a seismometer of any conventional type, also not shown. Across each of the secondaries 36 to 40, inclusive, there are connected the several mirror galvanometers 14 to 18, inclusive. Also across the secondaries 36, 37, 38 and 39 there are connected balanced bridge circuits 41, 42, 43 and 44. One leg of each of these bridges includes one of the string galvanometers 19 to 22, inclusive. Also connected across the bridges 41, 42, 43 and 44 are the outputs of secondaries 37, 38, 39 and 40, respectively. As a result of this action the galvanometer 19 responds to the algebraic sum of the output of secondaries 36 and 37, galvanometer 20 responds to the algebraic sum of the output of secondaries 37 and 38, galvanometer 21 responds to the algebraic sum of the output of secondaries 38 and 39 and galvanometer 22 responds to the algebraic sum of the output of the galvanometers 39 and 40. Balancing resistances 45 and 46 are inserted across secondaries 36 and 40 in order that the load on all of the transformers 36 to 40, inclusive, may be equal.

The necessity for the balancing resistors 45 and 46 is apparent if it is borne in mind that each of the legs of a balanced bridge such as those shown at 41, 42, 43 and 44 is equal in resistance (r) to each other leg of the same bridge. Thus in the case of secondary 36 we find, ignoring the resistance of galvanometer 14 and that of resistor 45, that the load (R) is:

$$R = r$$

On the other hand, the secondary 37, being connected to both bridges 41 and 42, the load is only:

$$R = \tfrac{1}{2}r$$

Thus, to compensate, the resistor 45 having the value of r is inserted across the secondary 45 so that the load may be expressed:

$$\tfrac{1}{R} = \tfrac{1}{2r} + \tfrac{1}{2r} + \tfrac{1}{r}$$

$$\tfrac{1}{R} = \tfrac{1}{2r} + \tfrac{1}{2r} + \tfrac{2}{2r}$$

$$2r = 4R$$

$$R = \tfrac{1}{2}r$$

The foregoing ignores the resistance of the mirror galvanometers but that, being equal in each case, reduces the total resistance in each circuit equally, and does not affect the load balance on the secondaries.

While the above example has been given with reference to seismic prospecting and a particular bridge circuit, it is to be understood that it is equally adaptable to any other types of comparative measurements in which two or more sets of data are to be recorded and compared. The black and white traces need not necessarily overlap but obviously the principles of this invention are useful only if the traces are close enough together or sufficiently numerous so that a chance of confusion exists.

I claim:

1. A method of recording a plurality of sets of data for comparative study that comprises projecting a light trace indicative of one set of data onto succeeding laterally extending portions of a moving photosensitive surface and projecting a shadow trace indicative of another set of data onto said same portions of said surface in closely adjacent relation to the light trace, the lateral positions of said traces being varied to indicate the data being recorded.

2. A method of recording a plurality of sets of data for comparative study that comprises projecting a light trace indicative of one set of data onto succeeding laterally extending portions of a moving photosensitive surface and simultaneously projecting a shadow trace indicative of another set of data onto said same portions of said surface in closely adjacent relation to the light trace, the lateral positions of said traces being varied to indicate the data being recorded.

3. A method of recording a plurality of sets of data for comparative study that comprises projecting a light trace indicative of one set of data onto succeeding laterally extending portions of a moving photosensitive surface and projecting a shadow trace indicative of another set of data onto said same portions of said surface in overlapping relation to the light trace, the lateral positions of said traces being varied to indicate the data being recorded.

4. A method as defined in claim 1 further characterized in that at least two sets of data are recorded as light traces and at least two sets of data are recorded as shadow traces making a total of at least four traces all recorded in closely adjacent relation.

5. A method as defined in claim 1 further characterized in that the sets of data recorded are vibrational data.

6. A method as defined in claim 1 further characterized in that the sets of data recorded are vibrational data resulting from the detection of seismic waves generated by a single explosion.

7. A multi-recording oscillograph comprising means for advancing film in a focal plane, a light source for exposing succeeding portions of said film, a string galvanometer in the light path between said source and said film for interrupting the light path to produce a shadow trace, a mirror galvanometer so positioned relative to said focal plane as to project a light trace on said portions of said film.

8. A multi-recording oscillograph comprising means for advancing film in a focal plane, a light source for exposing succeeding portions of said film, a string galvanometer in the light path between said source and said film for interrupting the light path to produce a shadow trace and a mirror galvanometer so positioned relatively to said focal plane as to project a light trace on said portions of said film closely adjacent said shadow trace.

9. A multi-recording oscillograph comprising means for advancing film in a focal plane, a light source for exposing succeeding portions of said film, a string galvanometer in the light path between said source and said film for interrupting the light path to produce a shadow trace, a mirror galvanometer so positioned relative to said focal plane as to project a light trace thereon intersecting said shadow trace.

10. A multi-recording oscillograph comprising means for advancing film in a focal plane, a light source for exposing succeeding portions of said film, a plurality of string galvanometers in the light path between said source and said film for interrupting the light path to produce a plurality of spaced shadow traces, a plurality of mirror galvanometers so positioned relative to said focal plane as to project light traces on said portion of said film intercepting or adjacent to at least some of the shadow traces thereon.

11. Apparatus for recording compressional wave data which comprises means for detecting compressional waves at at least two spaced points, means for amplifying the detected waves, a galvanometer for indicating the straight output of an amplifier, a galvanometer for indicating the composite output of both amplifiers, one of said galvanometers being of the mirror-type and the other being of the string-type, means for advancing film in a focal plane, and a light source for exposing succeeding portions of the film, said string galvanometer being in the light path between said source and said film to interrupt the light path to produce a shadow trace, and said mirror galvanometer being so positioned as to project a light trace on said film intersecting said shadow trace.

12. Apparatus for recording seismic wave data which comprises means for detecting compressional waves at at least two spaced points, means for amplifying the detected waves, a galvanometer for indicating the straight output of an amplifier, a galvanometer for indicating the composite output of both amplifiers, one of said galvanometers being of the mirror-type and the other being of the string-type, means for advancing film in a focal plane, and a light source for exposing succeeding portions of the film, said string galvanometer being in the light path between said source and said film to interrupt the light path to produce a shadow trace, and said mirror galvanometer being so positioned as to project a light trace on said film intersecting said shadow trace.

E. GORDON PERRY, Jr.

REFERENCES CITED

The following references are of record in the file of this patent:

UNITED STATES PATENTS

| Number | Name | Date |
|---|---|---|
| 2,072,950 | Huber | Mar. 9, 1937 |
| 2,348,401 | Manzanera | May 9, 1944 |